United States Patent [19]

Newcomb et al.

[11] Patent Number: 4,747,623
[45] Date of Patent: May 31, 1988

[54] ANTI-DISCONNECT ATTACHMENT FOR AIR LINE COUPLINGS

[76] Inventors: Bruce D. Newcomb; Bruce D. Newcomb, both of 834 Ellen St., Staunton, Va. 24401; Wayne H. Gosnell, Rt. 1, Box 227, Mt. Sidney, Va. 24467

[21] Appl. No.: 918,106
[22] Filed: Oct. 14, 1986
[51] Int. Cl.⁴ ............................................. F16L 55/00
[52] U.S. Cl. ........................................ 285/69; 285/91
[58] Field of Search ....................... 285/69, 72, 76, 79, 285/82, 87, 91

[56] References Cited
U.S. PATENT DOCUMENTS

| 409,121 | 8/1889 | Sturgeon | 285/69 |
| 1,033,890 | 7/1912 | Hendricks | 285/69 |
| 1,112,850 | 10/1914 | Sherer | 285/79 |
| 3,052,489 | 9/1962 | Stoudt | 285/69 |
| 3,879,066 | 4/1975 | Kozinski | 285/87 X |
| 4,530,522 | 7/1985 | Walker et al. | 285/91 |

FOREIGN PATENT DOCUMENTS 1552409  1/1968  France .................... 285/69

Primary Examiner—Dave W. Arola
Attorney, Agent, or Firm—Brady, O'Boyle and Gates

[57] ABSTRACT

A safety attachment for a two component air line "glad hand" coupling employed on tractor trailers and railway rolling stock is disclosed. The attachment is secured to one part of the coupling and includes a rigid blocking member which prevents relative rotation of the two coupling parts in a direction which could allow separation of the two coupling parts.

8 Claims, 2 Drawing Sheets

ANTI-DISCONNECT ATTACHMENT FOR AIR LINE COUPLINGS

BACKGROUND OF THE INVENTION

1. Technical Field

This invention relates broadly to vehicle air line couplings commonly called "glad hand" couplings, and more particularly relates to an anti-disconnect attachment for such couplings rendering it impossible for the couplings to open or separate accidentally during vehicle operation.

2. The Prior Art

Several anti-disconnect means for the couplings of vehicle air brake lines have been proposed in the prior art. Several proposals involve spring attachments which resist relative rotation and separation of the air line coupling parts. Spring devices generally are not deemed sufficiently safe to be relied upon entirely as an anti-disconnect means for the air brake lines of trucks and rail cars.

Other prior art proposals not employing springs involve rigid rotation-limiting stop elements on the air line coupling sections but such devices are permanently built into the coupling sections during manufacturing and therefore require special casting, forging or machining operations. In short, these prior art anti-disconnect devices not relying on springs require the designing and manufacturing of a new type of coupling which is a departure from the conventional "glad hand" couplings presently on the market and in the field in great numbers.

Accordingly, the present invention seeks to overcome the deficiencies of the prior art through provision of a simple attachment for conventional "glad hand" couplings of vehicle air lines widely in use, the attachment including a rigid member which blocks relative rotation of the two sections of the coupling in the direction which could result in accidental separation of the coupling sections during vehicle operation.

An object of the invention is to provide an anti-disconnect attachment for "glad hand" couplings which includes a rigid body having a mounting part attachable to one section of the coupling by existing screws thereof and further including a yoke portion which is apertured to receive a rigid blocking pin which prevents rotation of one coupling section relative to the other section in the direction which could result in separation of the coupling sections, leading to a possible disaster.

Another object is to provide an anti-disconnect device of the mentioned character having means to prevent accidental separation of the blocking pin from the yoke portion of the attachment.

Other objects of the invention are the provision of an anti-disconnect means for "glad hand" couplings which is highly simplified, rigid and therefore safe and reliable, economical to manufacture and install and which requires basically no alteration of the conventional construction of the most widely used types of "glad hand" couplings in vehicle air brake lines and the like.

SUMMARY OF THE INVENTION

The invention is best summarized as a unitary rigid body having an apertured mounting plate attached by a pair of existing screws on the coupling to one rotational section of the coupling. The rigid body includes a yoke portion generally perpendicular to the mounting plate including spaced apertured arms through which a rigid blocking pin is installed and held in place by a releasable wire bail or tether. The blocking pin prevents rotation in one direction of the coupling section opposite to the section to which the apertured mounting plate is attached.

DETAILED DESCRIPTION

Figure 3:
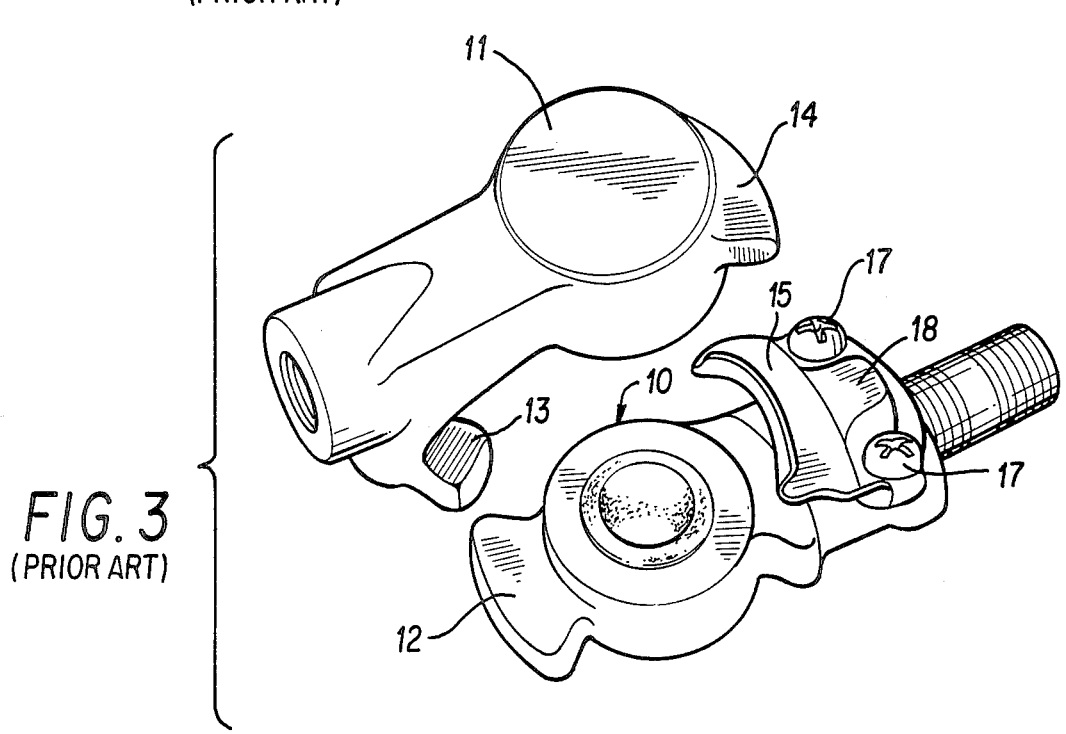
FIG. 3 is a perspective view showing the two sections of the coupling prior to engagement.
Figure 4:
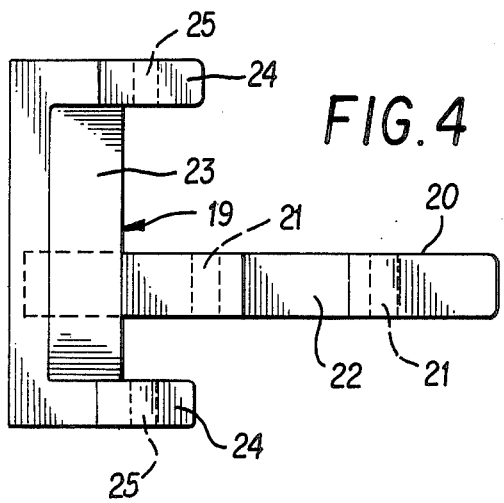
FIG. 4 is a side elevational of the unitary rigid body of the attachment.
Figure 5:
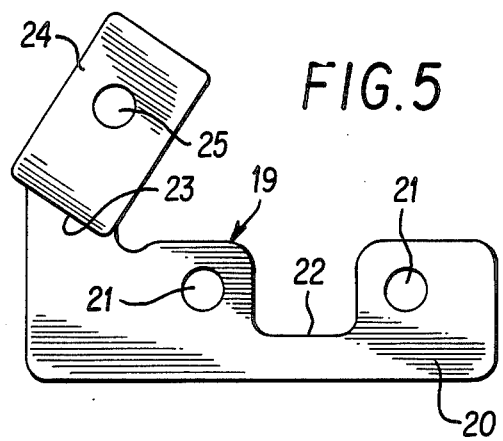
FIG. 5 is a plan view thereof.

Referring to the drawings in detail wherein like numerals designate like parts, FIG. 3 shows a separated "glad hand" coupling for vehicle air lines including a first or lower coupling section 10 attachable, for example, to a truck trailer and a second upper coupling section 11 attachable to a truck tractor.

Figure 2:
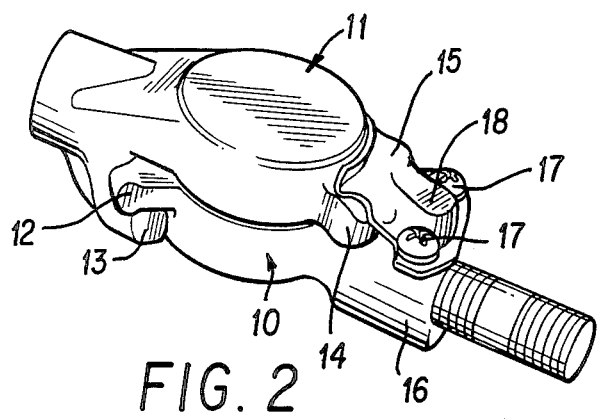
FIG. 2 is a perspective view of the coupling without the anti-disconnect attachment.

As shown in FIG. 2, the coupling sections 10 and 11 are engageable face-to-face in relatively rotatable relationship. Flanges 12 and 13 on the two coupling sections rotationally interfit to hold the two sections 10 and 11 together face-to-face. A similar flange 14 on the far end of coupling section 11 rotationally engages beneath a lip 15 formed on a standard attachment of the coupling secured to the underlying portion 16 of coupling section 10 by a pair of screws 17, received in threaded openings of the portion 16. Between the two screws 17, the lip attachment 15 includes a raised part 18 or stiffening rib. The elements thus far described are conventional in a well-known widely-used type of "glad hand" air line coupling.

It can be seen that the coupling sections 10 and 11 are engaged and separated by relative rotation. Under some circumstances, it is possible for the two coupling sections to separate during use on a vehicle which can cause the vehicle brakes to lock totally or, in some circumstances, to have no brakes at all, depending on whether the particular "glad hand" coupling is a "service" or "emergency" coupling. The interengagement of the flanges 12 and 13 and of the flange 14 and lip 15 is sometimes insufficient to prevent relative rotation in a direction resulting in parting of the two coupling sections. It is the purpose of the present invention to effectively prevent this parting or separation.

The attachment forming the main subject matter of the invention shown particularly in FIGS. 4 to 6a comprises a onepiece rigid body 19 including a flat mounting plate 20 having a pair of apertures 21 formed therethrough to receive the same screws 17 used to secure the lip attachment 15 to the coupling section 10, or somewhat longer screws, if necessary. The mounting plate 20 is installed on top of the lip attachment 15, FIG. 1, and a notch 22 in the mounting plate 20 between the apertures 21 straddles the raised part 18 of the lip attachment 15.

The rigid body 19 further comprises a yoke portion 23 perpendicular to the mounting plate 20 and extending above and below the mounting plate. At its top and bottom, the yoke portion has short horizontal arms 24 having coaxial apertures 25 formed therethrough. The yoke portion 23 is also fixed at an angle to the longitudinal axis of the mounting plate 20.

Figure 1:
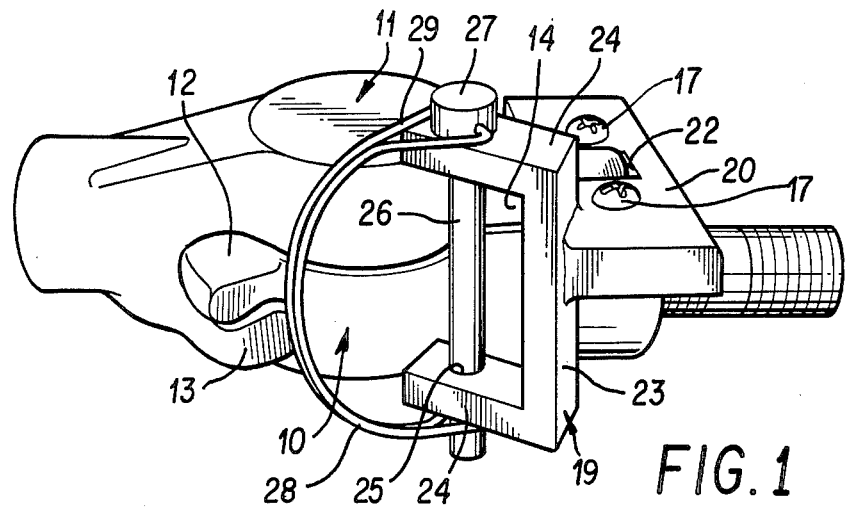
FIG. 1 is a perspective view of a "glad hand" coupling for vehicle air lines having an anti-disconnect attachment according to the present invention installed thereon.

As shown in FIG. 1, when the rigid body 19 is installed on the coupling section 10 in the described manner through the two screws 17, the yoke portion 23 is disposed near corresponding ends of the two coupling sections 10 and 11, with the yoke arms 24 near the top and bottom thereof.

A rigid blocking pin 26 is then inserted through the aligned apertures 25 with its head 27 resting on the upper horizontal arms 24, the blocking pin extending vertically across the two coupling sections 10 and 11. In this position, the rigid blocking pin 26 positively prevents the flange 14 of the upper coupling section 11 from swinging outwardly in its swiveled relationship to the lower coupling section 10 in the direction which could result in separation of the two coupling sections.

In truck application, the upper coupling section 11 is attached to the flexible hose of the tractor, and the lower coupling section 10 is attached rigidly to the trailer. In all applications, the two coupling sections 10 and 11 can swivel relatively around a vertical axis, and the positive arresting of this rotational or swiveling movement in one direction is the objective of the present invention.

Figure 6:
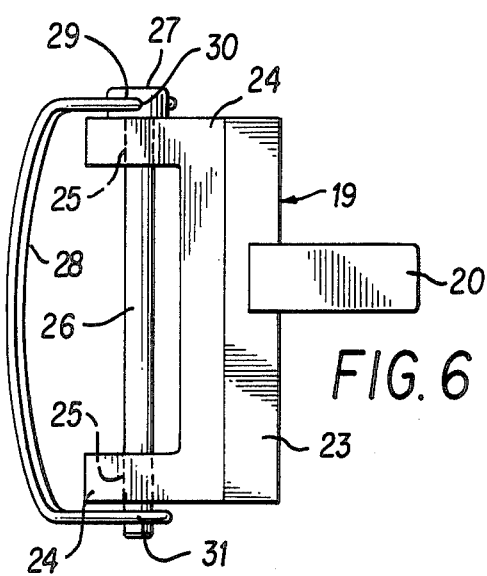
FIG. 6 is a side elevation of the rigid body showing the blocking pin installed thereon.
Figure 6A:
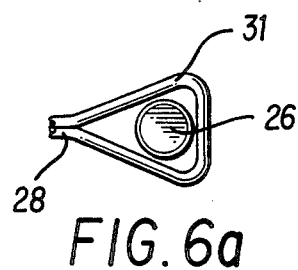
FIG. 6a is a fragmentary end elevation of the blocking pin and wire bail showing a spring noose portion of the latter which grips one end of the blocking pin.

A further safety feature of the attachment resides in the provision of a spring wire bail 28 having a top loop 29 permanently held in an aperture 30 formed through the head 27 of the blocking pin 26. As best shown in FIG. 6a, a spring loop 31 on the bottom of the bail 28 is expanded over the bottom end portion of the pin 26 below the lower arm 24, and, when released, the loop 31 grips the lower end portion of the blocking pin frictionally and prevents its accidental removal from the yoke portion 23.

It may be seen that the present invention provides a reliable and completely effective means for preventing accidental separation of a "glad hand" coupling used in a vehicle brake line or the like. The attachment is characterized by simplicity and economy, ease of installation and convenience of use. Most importantly, it does not rely on springs and provides rigidity in its blocking operation, as fully described.

Figure 7:
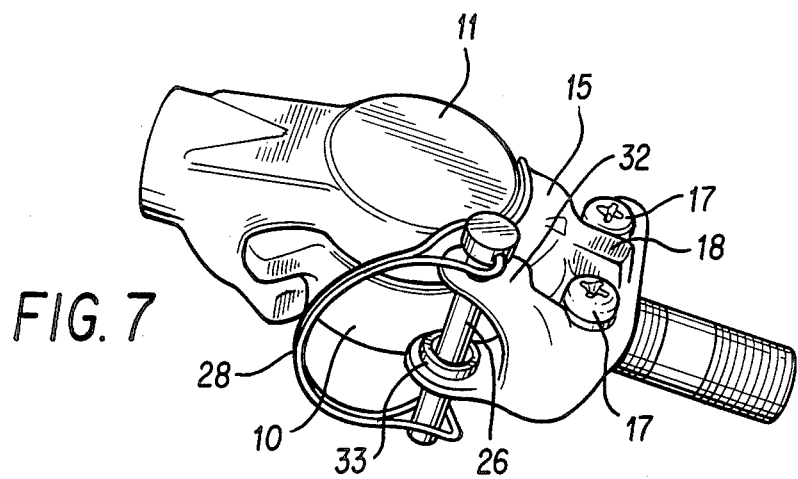
FIG. 7 is a perspective view of the invention according to a modification.

FIG. 7 shows a modification of the invention in which the blocking pin 26 having the attached spring bail 28 is installed through apertures in a pair of extensions 32 and 33 formed integrally on the lip attachment 15 secured by the screws 17 to the "glad hand" coupling section 10. This arrangement places the blocking pin 26 in exactly the same location described in the prior embodiment of the invention.

The prior embodiment has the advantage that the standard lip element 15 can be employed without any modification. The modified arrangement in FIG. 7 is a bit less bulky than the arrangement employing the rigid body 19 and blocking pin. Either form of the invention is equally effective.

It should be understood that the forms of the invention herewith shown and described are to be taken as preferred examples of the same, and that various changes in the shape, size and arrangement of parts may be resorted to, without departing from the spirit of the invention or scope of the subjoined claims.

What is claimed is:

1. An anti-disconnect attachment for an air line coupling of the type having two interfaced swiveled coupling parts including interengaging flanges which prevent separation of the coupling parts along their axis of rotation, said attachment comprising a rigid body fixed removably on one coupling part and having a yoke portion which is apertured, and a rigid blocking pin mounted releasably in the apertures of the yoke portion and extending parallel to the axis of rotation of said coupling parts and extending across and engageable with a flange of the other coupling part thereby blocking rotation of said coupling parts in a direction which could result in undesired separation thereof while in use, a lip attachment secured to said one coupling part for engaging the forward portion of the other coupling part, and means securing said lip attachment to said one coupling part, said rigid body being further fixed on said one coupling part by said means securing said lip attachment to said one coupling part.

2. An anti-disconnect attachment for an air line coupling as defined in claim 1 wherein said means securing said lip attachment to said one coupling part includes screws and the rigid body including an apertured mounting plate receiving said screws, and said yoke portion being fixed to the mounting plate.

3. An anti-disconnect attachment for an air line coupling as defined in claim 2, and a gripping element adapted to engage the blocking pin when the latter is installed in the apertures of the yoke portion to prevent accidental separation of the blocking pin from the yoke portion.

4. An anti-disconnect attachment for an air line coupling as defined in claim 3, and the gripping element comprising a wire bail attached to the blocking pin and having a spring loop adapted to grippingly engage one end portion of the blocking pin.

5. In a "glad hand" coupling for vehicle air lines including a pair of interengaged relatively rotational coupling parts having interengaging flange means, said coupling parts being held against separation along a common rotational axis of the coupling parts by said interengaging flange means, a blocking device fixed removably on one coupling part and including a bifurcated portion located externally adjacent said coupling part and having opposing arm segments directed inwardly towards said coupling parts and including a pair of opposing mounting holes, and a rigid elongated rotational blocking member inserted through said mounting holes of said arm segments extending across the path of movement of a portion of the other coupling part and being operable to engage said portion and thereby block rotation of the other coupling part in a direction which could result in undesired separation of the coupling parts.

6. An anti-disconnect attachment for a "glad hand" air line coupling including a pair of interfaced rotatably movable coupling components having interengaging flanges which prevent separation along their axis of rotation and comprising a rigid body including means fixedly securing said rigid body to one of said movable components of the coupling and said rigid body having a yoke portion including a pair of apertured yoke arms, and a rigid blocking pin inserted through the apertures of the yoke arms and being removably fixed therein, the other relatively movable component having abutment means thereon, said pin extending in rotation blocking relationship across the abutment means of the other relatively movable component of the coupling, said rotation blocking relationship being in a direction which could result in undesired separation of the coupling components.

7. An anti-disconnect attachment for a "glad hand" air line coupling as defined in claim 6, and the rigid body additionally having an apertured mounting plate fixed to the yoke portion and being attached to said one movable component by said means which includes existing screws on said component, and the rigid blocking pin and the apertures of the yoke arms having axes parallel to a common rotational axis of the two relatively movable components of the "glad hand" air line coupling.

8. An anti-disconnect attachment for a "glad hand" air line coupling as defined in claim 6, and a resilient gripping device fixed to said blocking pin and having an expandable loop end engageable grippingly with the rigid blocking pin whereby the blocking pin is held against accidental removal from the yoke arms.

* * * * *